July 16, 1957  J. A. MILLER  2,799,184
MULTISPEED TRANSMISSION
Filed April 5, 1956  2 Sheets-Sheet 1

INVENTOR.
JAMES A. MILLER
BY J. Frederick Bechtel
ATTY.

July 16, 1957  J. A. MILLER  2,799,184
MULTISPEED TRANSMISSION
Filed April 5, 1956  2 Sheets-Sheet 2
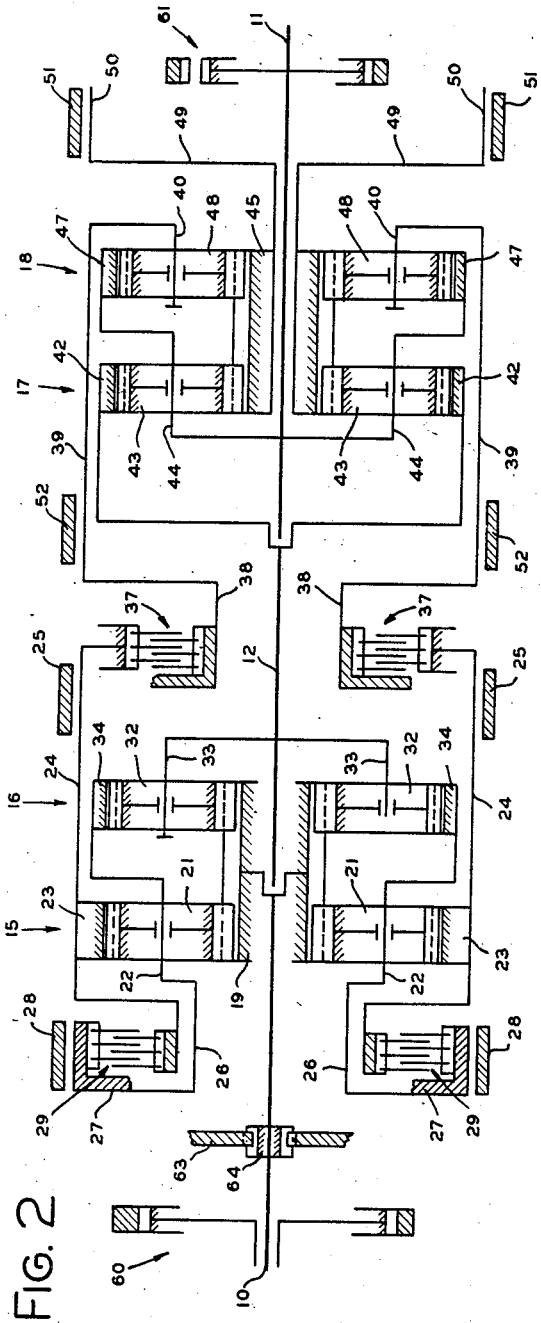
INVENTOR.
JAMES A. MILLER
BY *J. Frederick Bechtel*
ATTY.

United States Patent Office 2,799,184
Patented July 16, 1957

2,799,184

MULTISPEED TRANSMISSION

James A. Miller, Jackson, Mich., assignor to Clark Equipment Company, a corporation of Michigan Application April 5, 1956, Serial No. 576,283

20 Claims. (Cl. 74—759)

This invention relates generally to multispeed transmissions and, more particularly, to transmissions of this type especially well suited for use in trucks and other similar heavy duty vehicles.

The invention has for its principal object the provision of an improved transmission characterized by simple, compact construction with the attendant advantages relative to economy of construction and simplicity of installation and maintenance.

It is also an object of this invention to provide an improved transmission having six forward speed drive ratios and one reverse speed with all ratios being effected by the engagement of controllable friction devices whereby a change of speed ratio may be accomplished without interrupting the flow of torque from the vehicle engine.

It is a further object of the present invention to provide an improved transmission employing four band brakes and two multiple-disk friction clutches which are arranged to be actuated in different pairs in order to complete the aforementioned six forward speed ratios and the reverse drive.

Another and more specific object of the present invention is to provide a multispeed transmission of the character indicated above employing a pair of simple planetary gear input sets and a pair of simple planetary gear output sets so interrelated that one of the forward speed drives is effected by a split flow of power from the forward gear sets to the rear gear sets and the reverse drive is likewise provided by a split flow of power between the two gear groups.

A further object of the present invention is the provision of an improved transmission employing four simple, single pinion type planetary gear sets so arranged and interconnected that the aforementioned six forward speed ratios and the reverse drive may be effected.

The invention, both as to its organization and manner of operation, together with further objects and advantages thereof, will best be understood by reference to the specification taken in conjunction with the accompanying drawings wherein:

Fig. 2 is a schematic diagram of the transmission shown in Fig. 1; and

Fig. 3 is a table showing the various pairs of controllable friction devices which are engaged to complete the different drive ratios through the transmission.

Figure 1:
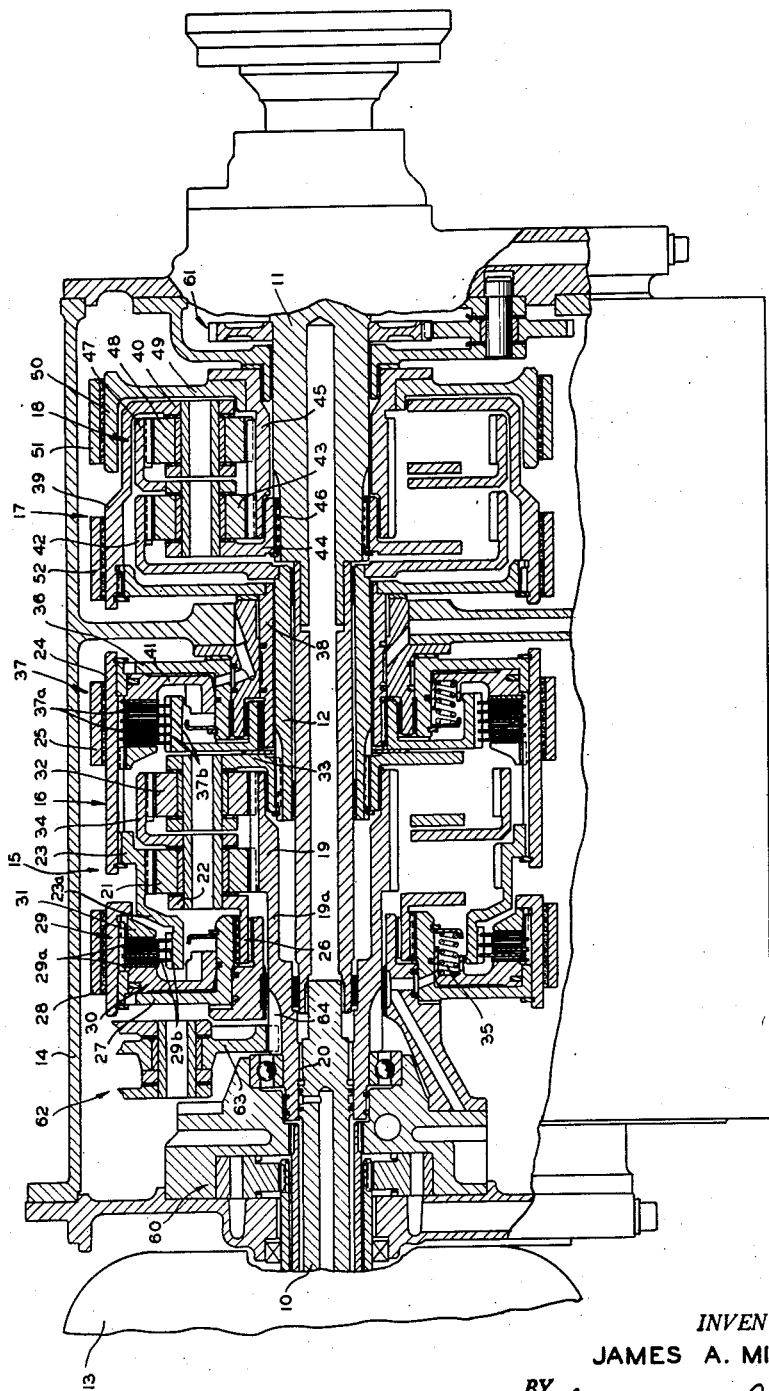
Fig. 1 is a longitudinal view, principally in section, illustrating a transmission characterized by the features of the present invention.

In accordance with the present invention, the foregoing and other objects are realized by providing a transmission including four simple planetary gear sets, two of which have common interconnected input elements driven from the engine of the vehicle through a torque converter or the like and the other two of which have common elements connected to the output shaft of the transmission. A pair of band brakes associated with the two input gear sets provide major and minor reductions therein while a multiple-disk friction clutch may be selectively actuated to interconnect two of the elements of the input gear sets to provide a direct drive therethrough. Similarly, a pair of band brakes associated with the output gear sets provide major and minor speed reductions therein. The input gear sets include a pair of output elements, one of which is fixedly connected to a first input element of the output sets and the other of which is adapted to be connected through a multiple-disk friction clutch to a second input element of the output gear sets, thereby to provide dual paths of power flow between the two gear groups. As previously indicated, the four described band brakes and the two multiple-disk friction clutches may be selectively actuated in different pairs in order to provide six forward speed ratios and a reverse drive through the transmission.

Referring now to the drawings, and more particularly to Figs. 1 and 2 thereof, there is disclosed a mechanism for transferring drive from a drive shaft 10 to a driven shaft 11 by way of an intermediate shaft 12 axially aligned with and disposed between the drive and driven shafts. As is illustrated in Fig. 1, the drive shaft 10 may be connected to the output member of a torque converter or fluid coupling 13 as is conventional in this art. The output shaft 11 is, of course, adapted to be connected through conventional differential gearing and other suitable connecting means to the wheels of the vehicle.

As is also shown in Fig. 1, the shafts 10, 11 and 12 have mutually telescoping end portions and are journaled within a suitable transmission casing 14. The latter casing also houses a pair of gear groups connected in tandem between the drive and driven shafts, the input gear group consisting of a pair of simple, single pinion type planetary gear sets respectively indicated by numerals 15 and 16 and the output gear group consisting of a somewhat similar pair of simple, single pinion type planetary gear sets respectively indicated by the numerals 17 and 18.

The planetary gear sets 15 and 16 have a common input sun gear 19 which includes an elongated sleeve portion 19a rotatably supported about the inwardly disposed end of driven shaft 11. In order to transfer the drive from drive shaft 10 to the sun gear 19, the sleeve portion 19a is splined to the drive shaft, as is indicated at 20. The gear set 15, in addition to the sun gear 19, comprises a plurality of planet pinions 21 spaced equal distances apart and rotatably mounted upon a planet carrier 22, with three such pinions preferably being provided. The pinions 21, of course, mesh with the sun gear 19 and with a ring gear 23 secured to an elongated sleeve 24 encircling the gear sets 15 and 16 and providing an annular brake drum which may be held stationary by a band brake 25 in order to provide torque reaction for the input gear group and establish a minor speed reduction therein. Planet carrier 22 is provided with an integral extension sleeve 26 splined to a clutch housing 27 and rotatably disposed about the sleeve 19a of the sun gear 19. The outer cylindrical face of the housing 27 provides a brake drum which may be engaged and held by a second band brake 28 in order to hold the planet carrier 22 stationary and provide major speed reduction through the input gear group.

The clutch housing 27 encloses a multiple-disk type friction clutch 29 of conventional construction having a plurality of interleaved clutch plates 29a and 29b respectively carried by the housing 27 and by an integral extension 23a formed on the ring gear 23. The plates of the clutch 29 are disposed between an annular backing plate 31 splined to the clutch housing 27 and an annular piston 30 longitudinally movable within the housing. Suitable biasing springs 35 acting against the piston 30 normally maintain the clutch plates in disengaged position. Application of fluid pressure to the face of the piston 30 moves the clutch plates 29a and 29b into frictional engagement whereupon the ring gear 23 and the planet carrier 22 of the gear set 15 are interconnected and a direct drive is provided through the input gear group.

The gear set 16 comprises, in addition to the sun gear 19 previously described, a plurality of equidistantly spaced planet pinions 32, preferably three in number, rotatably supported upon a planet carrier 33. Since the planet carrier 33 is splined to the intermediate shaft 12, it may be referred to as a first output element from the input gear group. The planet pinions 32 mesh with the sun gear 19 and with a ring gear 34 formed integrally with the planet carrier 22 of the gear set 15. Thus, when the brake 28 is effective to hold the planet carrier 22, the ring gear 34 is likewise held stationary, thereby to provide the aforementioned major speed reduction in the input gear group. Similarly, when the clutch 29 is energized to lock up the gear set 15 in the manner described above, the gear elements of the set 16 are also locked up, due to the fact that two of the gear elements of the set 16, i. e. the sun gear 19 and the ring gear 34, are respectively connected to two of the elements of the gear set 15, i. e. the sun gear 19 and the planet carrier 22.

The brake drum 24 connected to the ring gear 23 cooperates with appropriate structure 36 to form a clutch housing for a second multiple-disk friction type clutch 37 which is similar in construction to the clutch 29 described above. The clutch 37 comprises interleaved plates 37a and 37b respectively carried by the sleeve 24 and by interconnecting structure 38 rotatably disposed about the intermediate shaft 12. The latter structure is connected by means of a spline to an elongated brake drum 39 surrounding the gear sets 17 and 18 and formed on the planet carrier 40 of the gear set 18. Clutch plates 37a and 37b are normally held in disengaged position by means of biasing springs acting against piston 41. When the plates of the clutch 37 are engaged by application of fluid pressure to the face of the piston 41 in opposition to the biasing springs, the ring gear 23 of the gear set 15 is connected directly to the planet carrier 40 of the set 18 and, accordingly, the ring gear 23 may be considered to be a second output element from the input gear group and the planet carrier 40 may be considered to be a first input element to the rear planetary gear group.

The rear group, as indicated above, consists of the planetary gear sets 17 and 18. The planetary gear set 17 comprises a ring gear 42 splined to the intermediate shaft 12, with the result that this ring gear is permanently connected to be driven by the planet carrier 33 of the set 16 and hence may be considered to be a second input element of the rear planetary gear group. The gear set 17 further comprises a plurality of equidistantly spaced planet pinions 43 rotatably mounted upon a planet carrier 44 and meshing both with the ring gear 42 and with a sun gear 45. The planet carrier 44, as indicated at 46, is splined to the output shaft 11 and is connected directly to ring gear 47 of the gear set 18. The latter gear set, in addition to the ring gear 47, comprises a plurality of equidistantly spaced pinions 48, preferably three in number, rotatably mounted upon the planet carrier 40 and meshing both with the ring gear 47 and with the sun gear 45 which is common to both of the gear sets 17 and 18. An integral extension 49 formed on the common sun gear 45 terminates in a brake drum 50 which is adapted to be engaged and held by a band brake 51 in order to provide a minor reduction in the rear planetary gear group. In similar manner, the drum 39 is adapted to be engaged and held by a band brake 52 in order to hold the planet carrier 40 and provide major speed reduction through the rear group.

The transmission casing 14 also encloses front and rear pumps 60 and 61 of conventional construction which perform the functions of pressurizing and feeding oil to the torque converter or fluid coupling 13, providing lubrication for the transmission gearing, for cooling the friction brakes and clutches, if necessary, and also for providing fluid pressure to engage the friction brakes and clutches.

To provide power take-off for driving auxiliary equipment on the vehicle, a reach-in type adapter 62 may be inserted through an opening provided in the casing 14 until its driven gear 63 engages an externally toothed portion 64 of the drive shaft 10. The provision of power take-off directly from the drive shaft insures that the auxiliary equipment will not be affected by the speed reductions provided by the transmission.

As previously indicated, the transmission of the present invention is particularly well suited for use on trucks or heavy duty vehicles and, to this end, provides a neutral condition, together with six forward speed drive ratios and a single reverse drive. The transmission may be operated either automatically or manually by simultaneously applying different pairs of the clutches and brakes. For automatic operation the clutches 29 and 37 and the brakes 25, 28, 51 and 52 may be operated by the selective application of hydraulic pressure from any suitable control mechanism, as will be readily understood by those skilled in this art.

In neutral condition both of the clutches and all four of the brakes are disengaged, whereupon torque will be transmitted from the vehicle engine through the torque converter 13 to the drive shaft 10, thereby to effect rotation of the common sun gear 19 for the input gear group and also to drive the power take-off gear 63. No torque is transmitted to the driven shaft 11 in view of the absence of reaction elements in all four of the gear sets 15, 16, 17 and 18.

As will be apparent from a study of the table shown in Fig. 3, the first forward speed ratio is established by simultaneously applying the brakes 28 and 52, thereby effecting major speed reductions in both the input and output gear groups. It will be understood that, at this time, the brakes 25 and 51 and the clutches 29 and 37 are not engaged. Rotation of the drive shaft 10 and the sun gear 19 then causes the drive to pass through the planet pinions 32, the planet carrier 33, and through the intermediate shaft 12 to the ring gear 42 of the output planetary gear group. A portion of the power flows from the ring gear 42 to the planet pinions 43 and then to the planet carrier 44 which is attached to the driven shaft 11. Power also flows from the planet pinions 43 to the sun gear 45, and through the planet pinions 48 to the ring gear 47, which is also connected directly to the driven shaft 11.

The second forward speed ratio is obtained by releasing the band brake 52 and applying the band brake 51 while holding the brake 28 applied. Application of the brake 51 places the output gear group in minor speed reduction while the input gear group remains in major reduction. Under these conditions the drive flow through the first planetary gear set to the intermediate shaft is exactly as described above, but in the output planetary gear group the drive flows from the ring gear 42 through planet pinions 43 to the planet carrier 44 connected to the driven shaft 11. There is, of course, no second path for power flow in the output gear group in second speed.

The third forward speed ratio is obtained by releasing the brake 28 and actuating the brake 25, while at the same time holding the brake 51 applied. With the brake 25 applied, the input gear group is in minor speed reduction, while the output gear group obviously remains in minor reduction. Under these conditions, a dual path of power flow is effected in the input gear group, the first such path being from the sun gear 19 through the planet pinions 32 to the planet carrier 33 and the second such path being from the sun gear 19 through the planet pinions 21 and planet carrier 22, through the ring gear 34 and through the planet pinions 32 to the planet carrier 33. The power flow from the intermediate shaft 12 through the output gear group to the driven shaft 11 is, of course, exactly as described above for second speed.

To provide the fourth forward speed ratio the brake 51 remains applied, while the brake 25 is released and the clutch 37 is actuated. Under these conditions, a split path of power flow is established between the input gear group and the output gear group. Specifically, one such path is provided from the planet carrier 33 to the ring gear 42 by way of the intermediate shaft 12. A second path of power flow to the output gear group is provided through the planet pinions 21, through the ring gear 23, and through the clutch 37 to the planet carrier 40. Thus, in the fourth speed ratio both the ring gear 42 of the gear set 17 and the planet carrier 40 of the gear set 18 are driven by different output elements from the front or input gear group. The power delivered to the carrier 40 flows through the pinions 48 to the ring gear 47 connected to the output shaft 11, while the power delivered to the ring gear 42 flows through the pinions 43 to the planet carrier 44, likewise connected to the output shaft 11.

The fifth forward speed drive is established by releasing the clutch 37 and applying the clutch 29, while at the same time maintaining the brake 51 applied. With the clutch 29 applied, the planet carrier 22 is connected directly to the ring gear 23, with the result that the gear elements of the sets 15 and 16 are locked up and rotate as a unit, thereby establishing a direct drive from the sun gear 19 to the intermediate shaft 12. The output planetary gear group remains in minor reduction with the power flowing from the ring gear 42 through the planet pinions 43 to the planet carrier 44.

The sixth forward speed drive is obtained by releasing the brake 51 and applying the clutch 37, while maintaining the clutch 29 in energized condition. With the clutch 37 applied, the planet carrier 40 of the gear set 18 is directly connected to the ring gear 23 of the set 15 and, since the gear sets 15 and 16 are locked up by application of the clutch 29, it will be understood that sets 17 and 18 are now locked up also and a direct drive is provided from the input shaft 10 to the output shaft 11.

Reverse drive is effected by simultaneously applying the clutch 37 and the band brake 28. As indicated above, major speed reduction is provided in the first set with the brake 28 applied. With the clutch 37 applied, the ring gear 23 of the set 15 is connected to drive the planet carrier 40 of the set 18, with the result that a dual path of power flow from the input gear group to the output gear group is again provided. The first such path of power flow passes from the sun gear 19 and the planet pinions 32 to the carrier 33 connected to the intermediate shaft 12, while the second path includes the sun gear 19, the pinions 21, the ring gear 23, the clutch 37 and the planet carrier 40. The output planetary gear group functions to recombine these two paths of power flow and produces a reverse drive of the driven shaft 11.

In view of the foregoing description it will be recognized that the transmission of the present invention provides six forward speed ratios and a reverse drive between the input shaft and the output shaft, with each of these drives being effected by the simultaneous application of a pair of controllable friction devices. Moreover, it will be recognized that the transition from first to sixth speed in each ratio is effected by releasing only one of the controllable devices of each pair, thereby preventing the interruption of torque from the drive shaft 10.

While a particular embodiment of the invention has been shown, it will be understood, of course, that the invention is not limited thereto, since many modifications may be made, and it is therefore contemplated by the appended claims to cover any such modifications as fall within the true spirit and scope of the invention.

What is claimed as new and desired to be secured by Letters Patent of the United States is:

1. In a multispeed transmission, the combination of an input shaft, an output shaft, a first planetary group having a plurality of elements including an input element driven by said input shaft and a pair of output elements, a second planetary gear group having a plurality of elements including an output element connected to drive said driven shaft and a pair of input elements, means connecting a first output element of said first group to a first input element of said second group, means including a clutch for selectively connecting a second output element of the first group with a second input element of the second group, means including said clutch to provide a first dual path of power flow between said first and second groups to establish a reverse drive between said input and output shafts, and means including said clutch to provide a second and different dual path of power flow between said groups to effect a forward speed drive between said input shaft and said output shaft.

2. In a multispeed transmission, the combination of an input shaft, an output shaft, a first planetary group having a plurality of elements including an input element driven by said input shaft and a pair of output elements, a second planetary gear group having a plurality of elements including an output element connected to drive said driven shaft and a pair of input elements, means connecting a first output element of said first group to a first input element of said second group, means including a clutch for selectively connecting a second output element of the first group with a second input element of the second group, a first friction device for holding one of the elements of said first group to provide torque reaction, a second friction device for holding one of the elements of the second group to establish torque reaction, means including said clutch and one of said friction devices to provide a first dual path of power flow between said first and second groups to establish a first drive between said input and output shafts, and means including said clutch and the other of said friction devices to provide a second and different dual path of power flow between said groups to effect a second drive between said input shaft and said output shaft.

3. In a multispeed transmission, the combination of an input shaft, an output shaft, a first planetary group having a plurality of elements including an input element driven by said input shaft and a pair of output elements, a second planetary gear group having a plurality of elements including an output element connected to drive said driven shaft, and a pair of input elements, means connecting a first output element of said first group to a first input element of said second group, means including a clutch for selectively connecting a second output element of the first group with a second input element of the second group, a first friction device for holding one of the elements of said first group to provide torque reaction, a second friction device for holding one of the elements of the second group to establish torque reaction, means including said clutch and said first friction device to provide a first dual path of power flow between said first and second groups to establish a reverse drive between said input and output shafts, and means including said clutch and said second friction device to provide a second and different dual path of power flow between said groups to effect a forward speed drive between said input shaft and said output shaft.

4. In a multispeed transmission, the combination of an input shaft, an output shaft, a first pair of planetary gear sets having a plurality of elements including interconnected input elements driven by said input shaft and a pair of output elements, a second pair of planetary gear sets having a plurality of elements including interconnected output elements connected to drive said driven shaft and a pair of input elements, means connecting a first output element of said first pair of sets to a first input element of said second pair of sets, means including a clutch for selectively connecting a second output element of the first pair of sets with a second input element of the second pair of sets, means including said clutch to provide a first dual path of power flow between said first and second pairs of sets to establish a first drive between said input and output shafts, and means including said clutch to provide a second and different dual path of power flow between said pairs of sets to effect a second drive between said input shaft and said output shaft.

5. In a multispeed transmission, the combination of an input shaft, an output shaft, a first pair of planetary gear sets having a plurality of elements including interconnected input elements driven by said input shaft and a pair of output elements, a second pair of planetary gear sets having a plurality of elements including interconnected output elements connected to drive said driven shaft, and a pair of input elements, means connecting a first output element of said first pair of sets to a first input element of said second pair of sets, means including a clutch for selectively connecting a second output element of the first pair of sets with a second input element of the second pair of sets, a first brake for holding one of the elements of the first pair of sets to provide torque reaction, a second brake for holding one of the elements of the second pair of sets to provide torque reaction, means including said clutch and said first brake to provide a first dual path of power flow between said first and second pairs of sets to establish a reverse drive between said input and output shafts, and means including said clutch and said second brake to provide a second and different dual path of power flow between pairs of sets to effect a forward speed drive between said input shaft and said output shaft.

6. In a multispeed transmission, the combination of an input shaft, an output shaft, a first pair of planetary gear sets having a plurality of elements including an input element driven by said input shaft and a pair of output elements, a second pair of planetary gear sets having a plurality of elements including an output element connected to drive said driven shaft and a pair of input elements, means connecting a first output element of said first pair of sets to a first input element of said second pair of sets, means including a clutch for selectively connecting a second output element of the first pair of sets with a second input element of the second pair of sets, a first pair of friction devices respectively associated with different elements of said first pair of sets to provide different speed drives therethrough, a second pair of friction devices respectively associated with different elements of said second pair of sets to provide different speed drives therethrough, means including said clutch and one of the friction devices of the first pair to provide a first dual path of power flow between said first and second pairs of sets to establish a reverse drive between said input and output shafts, and means including said clutch and one of the friction devices of the second pair to provide a second and different dual path of power flow between said pairs of sets to effect a forward speed drive between said input shaft and said output shaft.

7. In a multispeed transmission, the combination of an input shaft, an output shaft, a first planetary gear group having a plurality of elements including an input element driven by said input shaft and a pair of output elements, a second planetary gear group having a plurality of elements including an output element connected to drive said driven shaft and a pair of input elements, means connecting a first output element of said first group to a first input element of the second group, means including a clutch for selectively connecting a second output element of the first group with a second input element of the second group, a first pair of friction devices respectively associated with different elements of said first group to provide different speed drives therethrough, a second pair of friction devices respectively associated with different elements of said second group to provide different speed drives therethrough, means including said clutch and one of the friction devices of the first pair to provide a first dual path of power flow between said first and second groups to establish a reverse drive between said input and output shafts, and means including said clutch and one of the friction devices of the second pair to provide a second and different dual path of power flow between said groups to effect a forward speed drive between said input shaft and said output shaft.

8. A mulitispeed transmission comprising an input shaft, an output shaft, a first planetary gear group having a plurality of elements including an input element driven by said input shaft and a pair of output elements, a second planetary group having a plurality of elements including an output element connected to drive said driven shaft and a pair of input elements, means connecting a first output element of said first group to a first input element of said second group, means including a first clutch for selectively connecting a second output element of the first group with a second input element of the second group, a second clutch selectively engageable to provide direct drive through said first group, a first pair of brakes respectively associated with different elements of said first group to provide different speed drives therethrough, a second pair of brakes respectively associated with different elements of said second pair of sets to provide different speed drives therethrough, said clutches and said two pairs of brakes being selectively engageable to provide at least six forward speed drive ratios and a reverse drive between said input shaft and said output shaft.

9. A multispeed transmission comprising an input shaft, an output shaft, a first planetary gear group having a plurality of elements including an input element driven by said input shaft and a pair of output elements, a second planetary gear group having a plurality of elements including an output element connected to drive said driven shaft and a pair of input elements, means connecting a first output element of said first group to a first input element of said second group, means including a first clutch for selectively connecting a second output element of the first group with a second input element of the second group, a second clutch selectively engageable to lock up the first group for direct drive therethrough, a first pair of brakes respectively associated with different elements of said first group to provide different speed drives therethrough, a second pair of brakes respectively associated with different elements of said second group to provide different speed drives therethrough, said clutches and said pairs of brakes being selectively engageable to provide a plurality of forward speed drive ratios and a reverse drive between said input and output shafts, the reverse drive being effected by simultaneous actuation of one of the brakes of the first pair and said first clutch, thereby providing a first dual path of power flow between said first and second groups, one of said forward speed ratios being provided by simultaneous actuation of said first clutch and one of the brakes of the second pair, thereby providing a second and different dual path of power flow between said first and second groups.

10. A multispeed transmission comprising an input shaft; an output shaft; two groups of planetary gears connected in tandem between said input and output shafts, the first of said groups being driven by said input shaft and the second of said groups driving said output shaft; a first brake associated with said first group and effective to provide a major speed reduction through the first group when engaged; a second brake associated with the first group and effective when engaged to provide a minor speed reduction through the first group; a first clutch for interconnecting two of the elements of said first group in order to provide a direct drive therethrough; a third brake associated with the second group and effective when engaged to provide a major speed reduction through the second group; a fourth brake associated with said second group and effective when engaged to provide a minor speed reduction through the second group; and means including a second clutch selectively engageable to connect an element of the first group to an element of the second group; said two clutches and four brakes being selectively engageable in different pairs to provide six forward speed drive ratios and a reverse drive between said input shaft and said output shaft.

11. A multispeed transmission comprising an input shaft; an output shaft; two groups of planetary gears connected in tandem between said input and output shafts, the first of said groups comprising a pair of input planetary gear sets driven by said input shaft and the second of said groups comprising a pair of output planetary gear sets driving said output shaft; a first brake associated with said first group and effective to provide a major speed reduction through the first group when engaged; a second brake associated with the first group and effective to provide a minor speed reduction through the first group when engaged; a first clutch for interconnecting two of the elements of one of said input gear sets in order to provide a direct drive through both of the gear sets of the first group; a third brake associated with the second group and effective when engaged to provide a major speed reduction through the second group; a fourth brake associated with said second group and effective when engaged to provide a minor speed reduction through the second group; and means including a second clutch selectively engageable to connect an element of the first group to an element of the second group; said two clutches and four brakes being selectively engageable to complete at least six forward speed drive ratios and a reverse drive between said input shaft and said output shaft.

12. A multispeed transmission comprising an input shaft; an output shaft; two groups of planetary gears connected in tandem between said input and output shafts, the first of said groups being driven by said input shaft and the second of said groups driving said output shaft; a first brake associated with said first group and effective to provide a major speed reduction through the first group when engaged; a second brake associated with the first group and effective to provide a minor speed reduction through the first group when engaged; a first clutch for interconnecting two of the elements of the first group in order to provide a direct drive therethrough; a third brake associated with the second group and effective when engaged to provide a major speed reduction through the second group; a fourth brake associated with said second group and effective when engaged to provide a minor speed reduction through the second group; and means including a second clutch selectively engageable to connect an element of the first group to an element of the second group; a first forward drive ratio being established by simultaneous application of said first and third brakes, a second forward speed drive ratio being established by simultaneous application of said first and fourth brakes, a third forward speed drive ratio being established by simultaneous application of said second and fourth brakes, a fourth forward speed drive ratio being established by simultaneous application of said fourth brake and said second clutch, thereby to provide a dual path of power flow from said input gear sets to said output gear sets, a fifth forward speed drive ratio being established by simultaneous application of said first clutch and said fourth brake, a sixth forward speed ratio being a direct drive between said input and output shafts and being established by simultaneous application of said first and second clutches, and reverse drive being established by simultaneous application of said first brake and said second clutch, thereby to provide a dual path of power flow from said input gear sets to said output gear sets.

13. The transmission defined by claim 12 wherein said first and second gear groups each comprises a pair of interrelated, simple, single pinion type planetary gear sets.

14. A multispeed transmission comprising an input shaft; an output shaft; an input planetary gear group driven by said input shaft; an output planetary gear group driving said output shaft; said input group having an input element driven by said input shaft, a reaction element, and a pair of output elements; a first brake for holding the reaction element; a second brake for holding a first of the output elements of the input group; a first clutch for interconnecting two of the elements of the input group in order to provide a direct drive therethrough; said output planetary group including an output element connected to said driven shaft, a reaction element, and a pair of input elements; means interconnecting the second output element of the input group and a first of the input elements of the output group; a third brake for holding the reaction element of the output group; a fourth brake for holding the second input element of the output group; and means including a second clutch for connecting the first output element of the input group to the second input element of the output group; said two clutches and four brakes being selectively engageable to complete at least six forward speed drive ratios and a reverse drive between said input and output shafts.

15. The transmission defined by claim 14 wherein a first forward drive ratio is established by simultaneous application of said first and third brakes, a second forward speed drive ratio is established by simultaneous application of said first and fourth brakes, a third forward speed drive ratio is established by simultaneous application of said second and fourth brakes, a fourth forward speed drive ratio is established by simultaneous application of said fourth brake and said second clutch, thereby to provide a dual path of power flow from said input gear group to said output gear group, a fifth forward speed drive ratio is established by simultaneous application of said first clutch and said fourth brake, a sixth forward speed ratio is a direct drive between said input and output shafts and is established by simultaneous application of said first and second clutches, and reverse drive is established by simultaneous application of said first brake and said second clutch, thereby to provide a dual path of power flow from said input gear group to said output gear group.

16. The transmission defined by claim 14 wherein said input gear group and said output gear group each comprise a pair of interrelated, simple planetary gear sets.

17. A multispeed transmission comprising an input shaft; an output shaft; an intermediate shaft disposed between and coaxial with said input and output shafts; a pair of input planetary gear sets driven by said input shaft; a pair of output planetary gear sets driving said output shaft; said pair of input sets having interconnected input elements driven by said input shaft, a pair of output elements, and interconnected reaction elements; one of the output elements being secured to said intermediate shaft; a first brake for holding the interconnected reaction elements, a second brake for holding the second output element of the first set; a first clutch for interconnecting two of the elements of one of said input sets in order to provide a direct drive through both of the input sets; said output planetary sets including interconnected output elements driving said driven shaft, a first input element connected to said intermediate shaft, a second input element, and interconnected reaction elements; a third brake for holding the second input element of the output sets; a fourth brake for holding the interconnected reaction elements of the output sets; and means including a second clutch for connecting the second output element of the input sets to the second input element of the output sets; said two clutches and four brakes being selectively engageable to complete a plurality of forward speed drive ratios and a reverse drive between said input and output shafts.

18. The transmission defined by claim 17 wherein a first forward drive ratio is established by simultaneous application of said first and third brakes, a second forward speed drive ratio is established by simultaneous application of said first and fourth brakes, a third forward speed drive ratio is established by simultaneous application of said second and fourth brakes, a fourth forward speed drive ratio is established by simultaneous application of said fourth brake and said second clutch, thereby to provide a dual path of power flow from said input gear sets to said output gear sets, a fifth forward speed drive ratio is established by simultaneous application of said first clutch and said fourth brake, a sixth forward speed ratio is a direct drive between said input and output shafts and is established by simultaneous application of said first and second clutches, and reverse drive is established by simultaneous application of said first brake and said second clutch, thereby to provide a dual path of power flow from said input gear sets to said output gear sets.

19. A multispeed transmission comprising an input shaft; an output shaft; a pair of input planetary gear sets driven by said input shaft; a pair of output planetary gear sets driving said output shaft; each of said pair of input sets having a plurality of elements including a sun gear driven by said input shaft, a ring gear, at least one planet pinion meshing with said sun and ring gears and a carrier for said pinion; the carrier of a first of the input sets being connected to the ring gear of the second of the input sets; a first brake for holding the planet carrier of the first input set; a second brake for holding the ring gear of said first set; a first clutch for interconnecting two of the elements of one of said input sets in order to provide a direct drive through both of the input sets; said output planetary sets each including a sun gear, a ring gear, at least one planet pinion meshing with said sun and ring gears, and a carrier for said pinion; the sun gears of said output sets being connected together; the carrier of a first of the output sets being connected to the ring gear of the second output set, and to the driven shaft; means connecting the ring gear of the first output set to the carrier of the second input set; a third brake for holding the planet carrier of the second output set; a fourth brake for holding the sun gears of both output sets; and means including a second clutch for connecting the ring gear of the first input set to the carrier of the second output set; said clutches and brakes being selectively engageable to provide a plurality of forward speed drive ratios and a reverse drive between said input shaft and said output shaft.

20. A multispeed transmission comprising an input shaft; an output shaft; an intermediate shaft disposed between and coaxial with said input and output shafts; a pair of input planetary gear sets driven by said input shaft; a pair of output planetary gear sets driving said output shaft; each of said pair of input sets having a plurality of elements including a sun gear driven by said input shaft, a ring gear, at least one planet pinion meshing with said sun and ring gears and a carrier for said pinion; the carrier of a first of the input sets being connected to the ring gear of the second of the input sets; the carrier of said second input set being secured to said intermediate shaft; a first brake for holding the planet carrier of the first input set; a second brake for holding the ring gear of said first set; a first clutch for interconnecting two of the elements of one of said input sets in order to provide a direct drive from said input shaft to said intermediate shaft; said output planetary sets each including a sun gear, a ring gear, at least one planet pinion meshing with said sun and ring gears, and a carrier for said pinion; the sun gears of said output sets being connected together; the carrier of a first of the output sets being connected to the ring gear of the second output set, and to the driven shaft; the ring gear of the first output set being connected to said intermediate shaft; a third brake for holding the planet carrier of the second output set; a fourth brake for holding the sun gears of both output sets; and means including a second clutch for connecting the ring gear of the first input set to the carrier of the second output set; a first forward drive ratio being established by simultaneous application of said first and third brakes, a second forward speed drive ratio being established by simultaneous application of said first and fourth brakes, a third forward speed drive ratio being established by simultaneous application of said second and fourth brakes, a fourth forward speed drive ratio being established by simultaneous application of said fourth brake and said second clutch, thereby to provide a dual path of power flow from said input gear sets to said output gear sets, a fifth forward speed drive ratio being established by simultaneous application of said first clutch and said fourth brake, a sixth forward speed ratio being a direct drive between said input and output shafts and being established by simultaneous application of said first and second clutches, and reverse drive being established by simultaneous application of said first brake and said second clutch, thereby to provide a dual path of power flow from said input gear sets to said output gear sets.

References Cited in the file of this patent

UNITED STATES PATENTS

| 2,764,904 | Kummich | Oct. 2, 1956 |

FOREIGN PATENTS

| 712,527 | Germany | Oct. 21, 1941 |